United States Patent [19]
van Rosmalen

[11] Patent Number: 5,337,298
[45] Date of Patent: Aug. 9, 1994

[54] RAPID ACCESS OPTICAL SCANNER HAVING A LONG OPTICAL ELEMENT

[75] Inventor: Gerard E. van Rosmalen, Eindhoven, Netherlands

[73] Assignee: U.S. Philips Corporation, New York, N.Y.

[21] Appl. No.: 970,326

[22] Filed: Nov. 2, 1992

[30] Foreign Application Priority Data

Jun. 19, 1992 [EP] European Pat. Off. ........ 92201789.2

[51] Int. Cl.[5] .............................................. G11B 7/00
[52] U.S. Cl. .................................. 369/44.22; 369/110; 369/112
[58] Field of Search ............. 369/30, 13, 44.13, 44.12, 369/44.14, 44.15, 44.16, 44.19, 44.21, 44.22, 44.38, 44.41, 44.42, 44.26, 114, 112, 119, 32, 58, 110; 360/72.2, 77.01, 77.02, 77.03, 77.07, 77.11; 358/342; 250/201.5, 204

[56] References Cited

U.S. PATENT DOCUMENTS

| | | | |
|---|---|---|---|
| 4,023,033 | 5/1977 | Bricot et al. | 250/201.5 |
| 4,057,833 | 11/1977 | Braat | 369/44.42 |
| 4,363,116 | 12/1982 | Kleuters et al. | 369/30 |
| 4,638,471 | 1/1987 | van Rosmalen | 369/44.42 |
| 5,159,588 | 10/1992 | Nakano et al. | 369/44.22 |

FOREIGN PATENT DOCUMENTS

0206396 12/1986 European Pat. Off. .

*Primary Examiner*—Robert J. Pascal
*Assistant Examiner*—Ali Neyzari
*Attorney, Agent, or Firm*—David R. Treacy

[57] ABSTRACT

An optical-strength element, elongated in a direction transverse to the radiation beam at the location where the beam impinges on the element, directs the portion of the beam entering the objective system in a direction parallel to the entry axis of the objective system. A scanning element causes the radiation beam to scan along the length of the element as the objective system is moved along its stroke, thereby moving the focussed spot of the beam along the surface to be optically scanned.

26 Claims, 8 Drawing Sheets

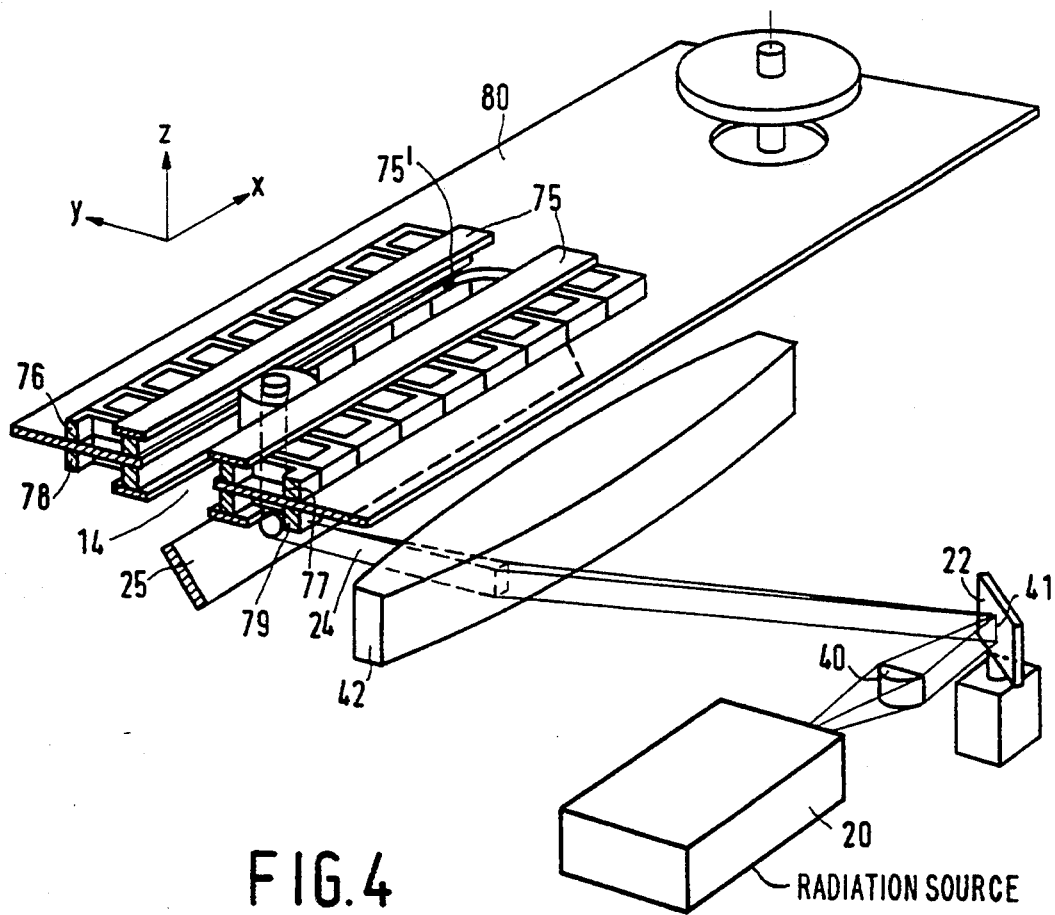
FIG. 4
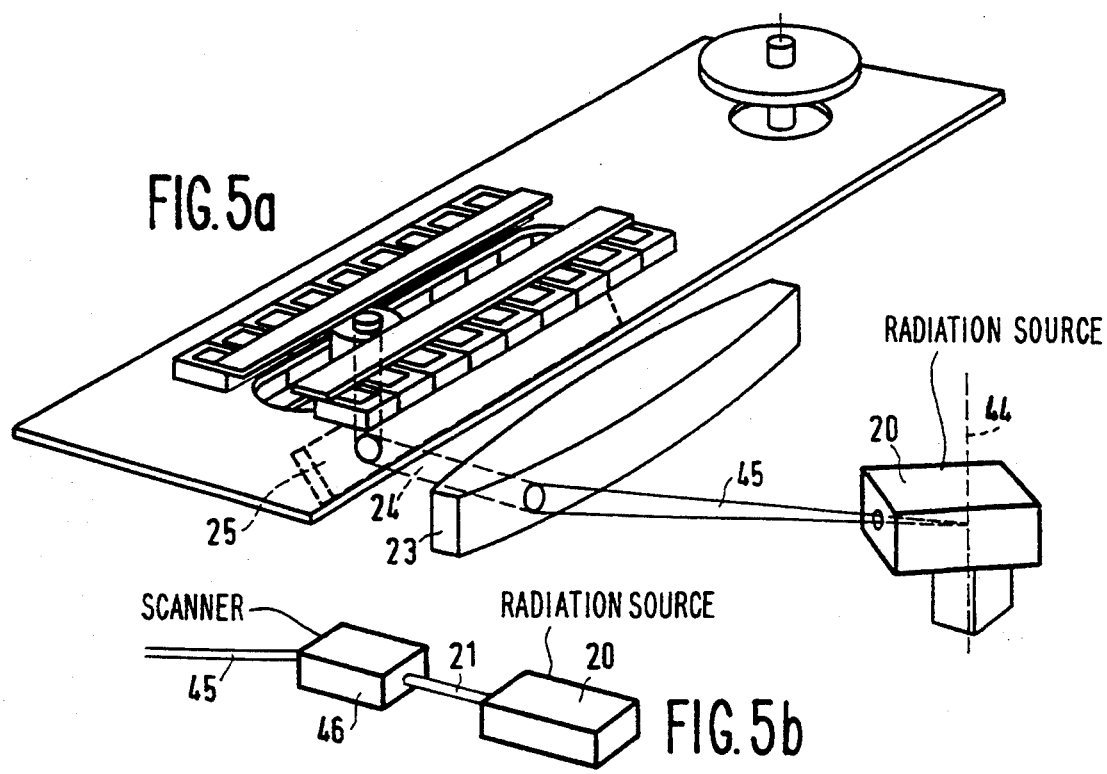
FIG. 5a
FIG. 5b

RAPID ACCESS OPTICAL SCANNER HAVING A LONG OPTICAL ELEMENT

CROSS-REFERENCE TO RELATED APPLICATION

This application is related to my concurrently filed application, Ser. No. 08/969,918.

BACKGROUND OF THE INVENTION

The invention relates to a device for optically scanning a surface, which device comprises a radiation source for supplying a radiation beam, an objective lens mounted in an objective system for focusing the radiation beam on the surface and drive means for displacing the objective system over a long stroke crossing a multiplicity of scan-resolvable locations.

A device of this type is suitable, inter alia for reading disc-shaped optical record carriers in which the information is arranged in concentrical or spiral tracks. A single track on the record carrier can be scanned by rotating the record carrier. To scan other tracks, the objective lens must be moved radially across the tracks. For a short access time to the stored information, it must be possible to move the objective lens rapidly across the tracks.

A device as described in the opening paragraph is known from U.S. Pat. No. 4,363,116. In this known device the objective lens is secured in a carriage which can be displaced over a given stroke in the radial direction with respect to an optical record carrier to be scanned. The carriage is provided with a focus actuator for moving the objective lens in a direction perpendicular to the plane of the record carrier in order to keep the radiation beam focused in the plane of the tracks. The carriage is driven by a carriage actuator with which the carriage and hence the objective lens can be moved radially with respect to the record carrier. The carriage is also provided with an adjustable element in the form of a pivotal mirror for radially moving the focal spot in order to track small radial excursions of the track to be scanned, which excursions are too fast to be tracked by the carriage actuator. A non-movable part of the device includes an optical system accommodating a radiation source and a detection unit. The optical system supplies a collimated radiation beam which is passed to the carriage in the radial direction parallel to the plane of the record carrier. The pivotal mirror in the carriage, at a nominal angle of 45° to the radiation beam, deflects the radiation beam upwards to the objective lens. The mirror always receives the radiation beam, irrespective of the position of the carriage in said stroke.

A drawback of the known device is the relatively large mass of the carriage. Consequently, it is not possible to move the focal spot rapidly to an arbitrary radial position on the record carrier, in other words to realise a short access time to the information.

SUMMARY OF THE INVENTION

It is an object of the invention to provide a device having a short access time.

To this end the device according to the invention is characterized in that an optical-strength element having a length which is approximately equal to the length of the stroke is arranged in the path of the radiation beam between the radiation source and the objective lens, and in that the device comprises a scanning device arranged between the radiation source and said element for scanning the radiation beam across the optical-strength element, thereby displacing the radiation beam parallel to itself over a distance of the order of the stroke of the objective system. By combination of the scanning device and the element it is possible to displace the radiation beam over the stroke of the objective system so that the radiation beam is always caused to be incident on the objective lens. It is then no longer necessary that the carriage comprises a mirror. As a result the carriage can have a lighter weight and be displaced more rapidly. It is also possible for the combination to irradiate an objective lens which is suspended in an actuator in a floating way, with only the objective lens moving over the stroke. Due to the small mass of the objective lens, very short access times can be realised.

A preferred embodiment of the device according to the invention is characterized in that the radiation beam is focused at a focal point of the optical-strength element, and the focal point is located at the side of the radiation source. The radiation beam at the objective side of the element is then collimated so that the distance between the element and the objective lens is not critical.

If the focal point is substantially located on an axis about which the radiation beam is scanned, the radiation beam is scanned from the focal point of the optical-strength element. The chief ray of the beam between the element and the objective lens thereby remains parallel to the optical axis of the element. The angle at which the radiation beam is incident on the objective lens does not change over the stroke of the objective lens so that the focal spot formed by the objective lens has a constant and high quality.

An advantageous embodiment of the device according to the invention is characterized in that the scanning device comprises a pivotal mirror. A pivotal mirror has a simple construction and may have a high pivoting speed.

A particular embodiment of the device according to the invention is characterized in that the scanning device comprises means for pivoting the radiation source. By integrating the radiation source, a detection system and possibly a condenser lens in a pivotable optical unit, the device may have a compact design.

A further advantage is obtained if at least one cylindrical optical element is arranged in the path of the radiation beam. Consequently, the radiation beam does not focus on a point on the pivotal mirror but on a line so that the reflection of the beam is less sensitive to dust and errors in the reflective coating of the pivotal mirror. The optical-strength element can also be manufactured at lower cost if it is a cylindrical element.

An advantageous embodiment of the device according to the invention is characterized in that the optical-strength element comprises a lens.

If in accordance with a further characteristic feature said lens is formed by an elongated bar-shaped, non-central portion of an imaginary circular lens, two instead of one of such bar-shaped lenses can be made from a single circular lens. These non-central bar-shaped lenses have the same optical quality as a central bar-shaped lens.

The device may alternatively be characterized in that the optical-strength element comprises an elongated concave mirror. Two functions may be united in this mirror, viz. collimation of the radiation beam and folding of the radiation path between the radiation source and the objective lens. The folding provides the possibility of a more compact structure of the device.

The radiation path may also be folded by arranging a plane mirror between the radiation source and the objective lens.

The device according to the invention is further characterized in that the device comprises a detector for determining the direction of the beam originating from the scanning device, an output of said detector being connected to a control input of the objective drive means. This ensures a correct control of the drive means.

A particular embodiment of the device according to the invention is characterized in that the device comprises a four-quadrant detector for generating signals representing the orientation of the objective system. Such a detector may be used for controlling the orientation of the objective system and has the advantage that it has a large capturing range.

A particular embodiment of the device according to the invention is characterized in that a substantially conical annular reflector is arranged around the objective lens for reflecting a part of the radiation beam towards a detection unit for generating signals representing the position and orientation of the objective system. Said position and orientation can be determined simply and accurately by means of the annular reflector.

A further preferred embodiment of the device according to the invention having a short access time is characterized in that a permanent magnet for driving the objective system is arranged in the objective system and in that the drive means comprise a stationary coil system for electromagnetically and contactlessly driving the objective system along three mutually perpendicular axes and for tilting the objective system about two of said axes. The coil system comprises two parallel rows of coil pairs located over the length of the stroke at both sides of the objective system, and each coil pair comprises two coils arranged one above the other in the direction of the optical axis of the objective lens. Together with the ring magnet, the coil system constitutes an actuator having five degrees of freedom. The objective lens is suspended in a floating manner and can be moved very rapidly in, inter alia the radial direction. The number of moving components is reduced to a minimum, resulting in a light weight construction and a very fast movement of the focal spot.

These and other aspects of the invention will be apparent from and elucidated with reference to the embodiments described hereinafter.

BRIEF DESCRIPTION OF THE DRAWING

FIG. 4 shows a device comprising cylindrical lenses;

FIG. 5a shows a device comprising a pivotal radiation source;

FIG. 5b shows an electronically driven scanning device;

DESCRIPTION OF THE PREFERRED EMBODIMENTS

Figure 1:
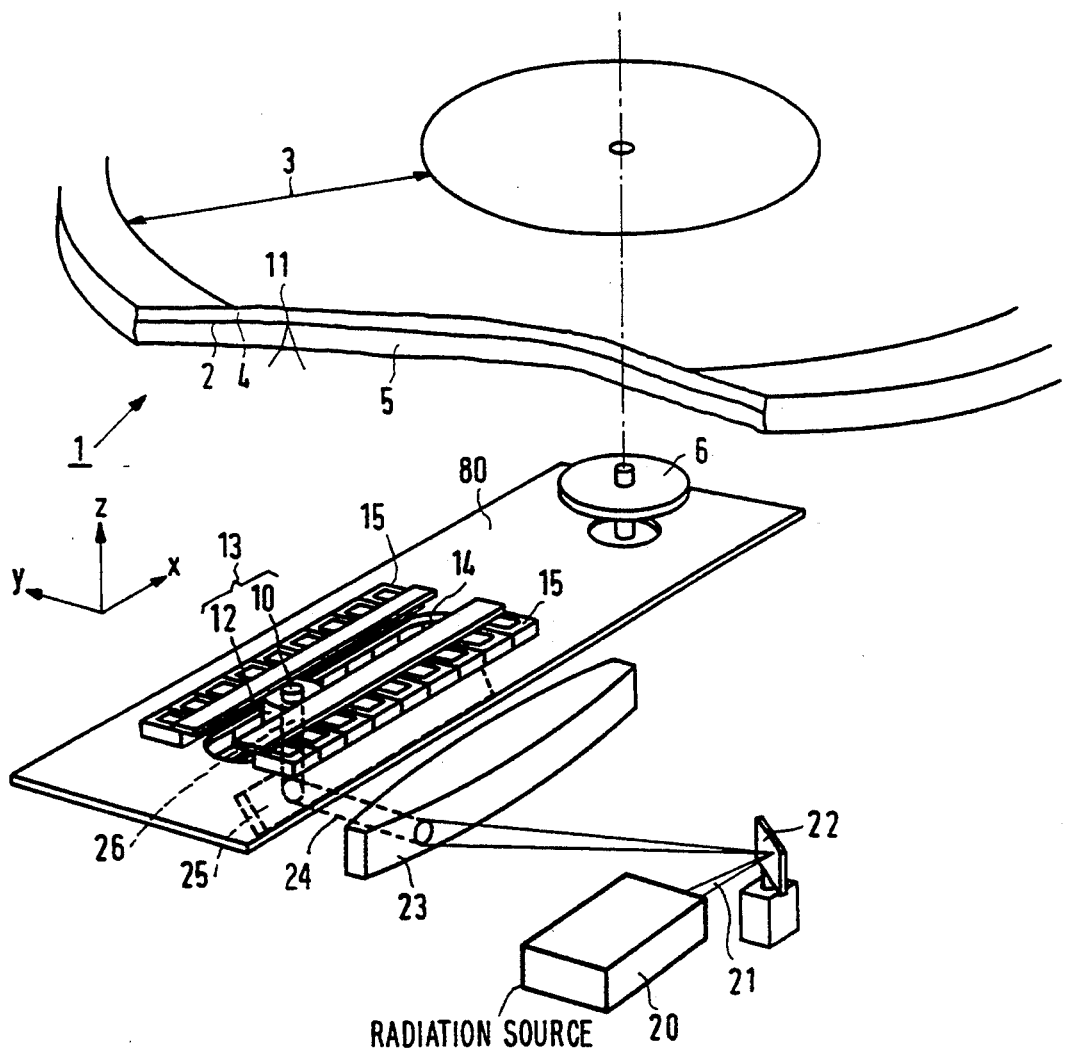
FIG. 1 shows a device according to the invention, comprising a scanning lens.

FIG. 1 shows a scanning device for scanning a disc-shaped optical record carrier 1. The information is stored on the record carrier in an information layer 2 in the form of a large number of optically readable areas (not shown) which are arranged in a plurality of concentrical tracks or quasi-concentrical tracks together forming a spiral track. The collection of tracks extends across an annulus having a given width 3. The upper side of the information layer 2 is provided with a protective coating 4 and is supported by a transparent substrate 5. The information layer 2 is read through the substrate. The record carrier is arranged on a rotatable shaft 6 which is driven by a motor (not shown in the Figure). For the sake of clarity the record carrier is shown some distance above the shaft.

The information layer 2 is scanned by a radiation beam which is focused on the information layer to a focal spot 11 by means of an objective lens 10. The objective lens 10 and an axially magnetized ring magnet 12 arranged around the objective lens constitute an objective system 13 which, according to the invention, is electromagnetically suspended in a slit 14 of an elongated stationary coil system 15 with which the objective system can be moved in the radial direction, i.e. transverse to the track direction. By rotating the record carrier, one track can be scanned to read information from this track or to inscribe information. To be able to scan all tracks in the record carrier 1, it must be possible to displace the objective system in the radial direction with respect to the record carrier over a distance which is at least equal to the width 3 of the collection of tracks. Together with the coil system 15 the ring magnet 12 constitutes a 5-D (five-dimensional) actuator determining the movement of the objective system in five degrees of freedom. The degrees of freedom can be simply visualized with reference to a rectangular system of coordinates with axes X, Y and Z and the origin in the centre of the objective lens. In FIG. 1 the system of coordinates is shown next to the device for the sake of clarity. The X, Y and Z directions correspond to the radial and tangential directions in the plane of the record carrier and the axial direction perpendicular to said plane, respectively. Said five degrees of freedom are: three translations in X, Y and Z directions and two rotations about the X and Y axes. The sixth degree of freedom, rotation about the Z axis, i.e. the optical axis of the objective lens, is irrelevant because the objective system is symmetrical around this axis. The translation in the X direction is used to keep the focal spot 11 in the radial direction on a track to be scanned (radial tracking) and to displace the objective system from one to another track to be scanned. The translation in the Z direction is used to keep the focal spot in the plane of the information layer 2 (focusing). The translation in the Y direction is used to keep the objective system 13 centrally between the coils of the coil system and to correct possible tangential time errors, for example, when scanning a record carrier with video information. The two rotations about the X and Y axes are used to keep the optical axis of the objective lens 10 parallel to the chief ray of the irradiating radiation beam. The control of the position and orientation of the objective system in the coil system, the construction of this system and the generation of the signals required for the control will be described with reference to FIGS. 6 to 10.

An advantage of the 5-D actuator described above is the compactness of the moving part, i.e. of the objective system 13. The moving part of a known actuator, for example, as described in said U.S. Pat. No. 4,363,116 comprises a carriage accommodating a focus actuator for moving the objective lens in the axial direction and a plane mirror for directing a horizontally extending radiation beam upwards and for fine control of the focal spot in the radial direction. Such a carriage is relatively heavy, for example more than 20 grams and great forces are required to displace the carriage rapidly towards a track to be scanned. The device according to the invention is designed in such a way that the objective system 13 is the only moving element of the actuator. This objective system may be very light, having a weight of, for example less than 1 gram, so that it can be moved very rapidly. It will be evident that the access time to an arbitrary track in the device according to the invention will thus be considerably shorter than in the known device. A further problem of the carriage in the known device, which problem does not occur in the device according to the invention, is that the carriage has a spectrum of eigenvibrations. If the frequency of an eigenvibration is within the bandwidth of a control of the carriage, there will be phase loss in the control loop, which may lead to instability of the control. For example, the frequency of the parasitic eigenvibration of leaf springs which are generally used for suspending the objective system in a carriage is often between 500 Hz and 2 kHz. The eigenfrequencies of construction parts of the carriage are generally between 1 kHz and 20 kHz. A large part of these frequencies is within the bandwidths of the carriage controls which generally range as far as 1 to 4 kHz, dependent on the required control rate. Since the objective system 13 is a compact body having a characteristic dimension of 5 mm for which the frequencies of its eigenvibrations are above 100 kHz, i.e. far above the bandwidths of the controls, the device according to the invention, in which the objective system is the only element moving in the radial direction, has the advantage that the controls are much more stable. Since in the device according to the invention the objective system is no longer suspended by means of leaf springs, the problems Which are inherent in the use of leaf springs, for example, such a change of the spring constant and of the damping that the focus control becomes unstable, no longer occur.

The radiation for scanning the record carrier 1 is supplied by an optical system 20 comprising a radiation source, for example a diode laser. This system supplies a radiation beam 21 which can be scanned through a given angle by a scanning device which, as is shown in FIG. 1, may comprise a pivotal mirror 22. According to the invention the beam 21 is focused on a point of the axis of rotation of the pivotal mirror. This point is also a focal point of an optical-strength dement 23. In FIG. 1 the element 23 is a scanning lens, i.e. a bar-shaped section of a circular lens. Since the beam 21 is focused at a focal point of the scanning lens, the beam 24 is collimated after passage through the scanning lens with a chief ray parallel to the optical axis of the scanning lens. The pivotal mirror 22 may scan the radiation beam over the length of the scanning lens 23 so that the collimated beam is displaced over the same length. During this displacement the chief ray of the beam 24 remains parallel to the optical axis of the scanning lens because the pivotal mirror 22 is at the focal point of the scanning lens. A plane mirror 25 arranged at an angle of 45° to the optical axis of the scanning lens reflects the beam 24 as beam 26 with a chief ray parallel to the Z axis, which beam is projected towards the objective lens 10. In its turn the objective lens focuses the beam 26 to the focal spot 11 on the information layer 2. The pivotal mirror is controlled in such a way that the beam 26 is substantially incident on the centre of the objective lens 10. The beam lengths 21 and 24 thus follow a path determined by the scanning system formed by the mirror 22 and elongated element 23. Along the portion 24 of this path, and along the path travelled by the beam 26 the beam direction remains parallel to itself. The beam reflected by the information layer returns via the radiation path described to the optical system 20 which is provided in known manner with a radiation-sensitive detection unit (not shown in the Figure) which converts the modulation of the reflected beam by means of a signal processing and decoding circuit into an information signal which comprises the information read from the record carrier, and possibly into servosignals for the radial control and for focusing.

It will be evident that the plane mirror 25 arranged at an angle of 45° need not move like the mirror having the same function in the device according to said U.S. Pat. No. 4,363,116. Consequently, the moving part can become lighter and more compact, which increases the frequency of its eigenvibrations. Moreover, such a plane mirror, secured to the objective system, makes it necessary to fix the above-mentioned sixth degree of freedom, rotation about the Z axis, of the objective system in order to keep the mirror directed onto the projected beam. This would complicate the actuator. The small weight of the moving parts, viz. the objective system 13 and the pivotal mirror 22, renders very short access times possible.

In addition to or instead of the plane mirror 25 a mirror for folding the radiation path may be arranged at any arbitrary position in the radiation path. A plane mirror may be arranged between the optical system 20 and the pivotal mirror 22 and/or between the pivotal mirror 22 and the scanning lens instead of between the scanning lens 23 and the objective lens 10. If the plane mirror 25 is omitted, the scanning lens 23 must be rotated 90° around the X axis with respect to the position shown in FIG. 1 and arranged under the objective system.

The scanning lens 23 has a length covering at least the stroke of the objective system 13. The optical requirements to be imposed on the scanning lens for giving the radiation path the desired high quality are not extraordinarily stringent despite this length. This is because the beam only uses a small part of the scanning lens at any instant so that only the optical errors of the scanning lens covering said small part are important.

Figure 2A:
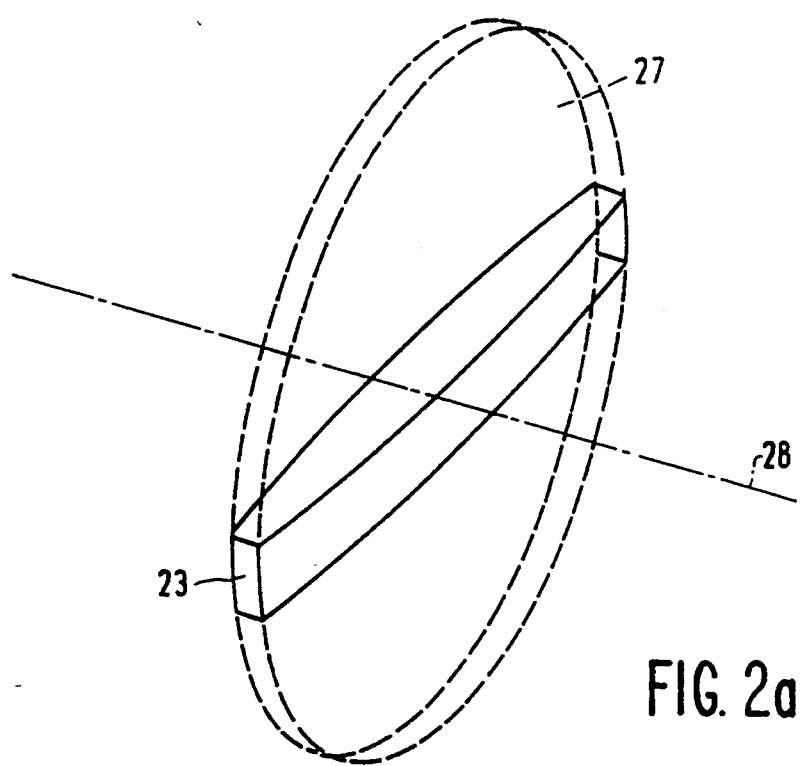
FIG. 2a shows a scanning lens in the form of a central section of a circular lens.
Figure 2B:
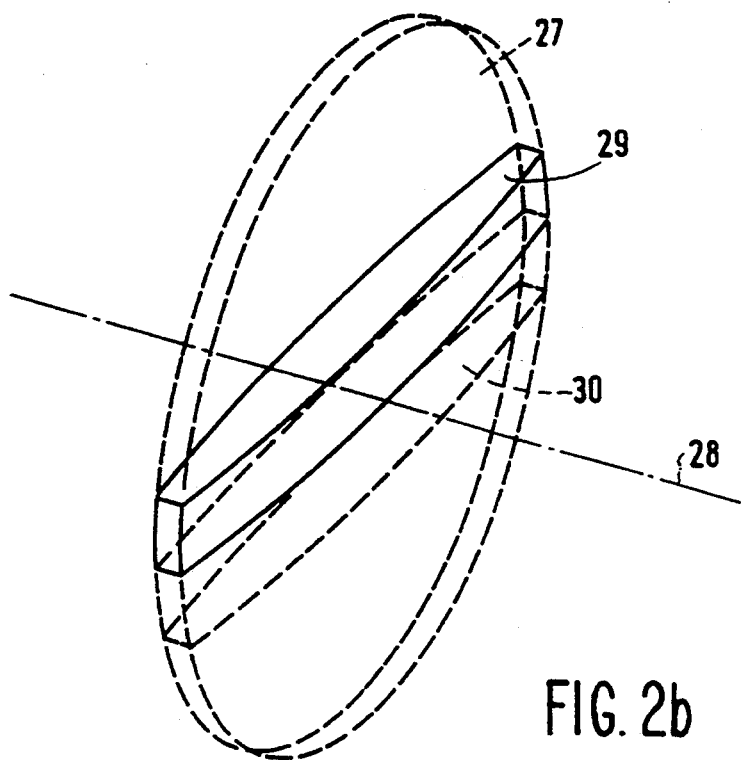
FIG. 2b shows two scanning lenses formed by two non-central sections of a circular lens.

The scanning lens 23 shown in FIG. 1 is a bar-shaped section from the centre of a circular lens. Only one such section can be made from a circular lens 27, as is shown in FIG. 2a. The dot-and-dash line 28 denotes the optical axis of the circular lens which also passes through the centre of the scanning lens 23. As is shown in FIG. 2b, two bar-shaped sections can, however, be obtained from a single circular lens 27. One section 29 is located directly above the optical axis 28 of the circular lens, the other section 30, shown in a broken line, is located directly underneath. The optical axis of the circular lens now no longer passes through the centre of the section 29 or 30. When such an off-axis section 29 or 30 is arranged in the device, it should therefore be ensured that it is not irradiated, like the on-axis section 23, from a point in the focal plane of the lens on an axis through the centre of the bar-shaped lens parallel to the optical axis of the imaginary circular lens. In fact, the bar-shaped lens 29 or 30 would then be irradiated from a point outside its own optical axis. This gives rise to lens errors such as coma which can only be compensated by means of multiple lenses, for example doublets. The lens errors can be obviated by irradiating the bar-shaped lens 29 or 30 from a point on fire optical axis 28 of the circular lens 27.

Figure 3:
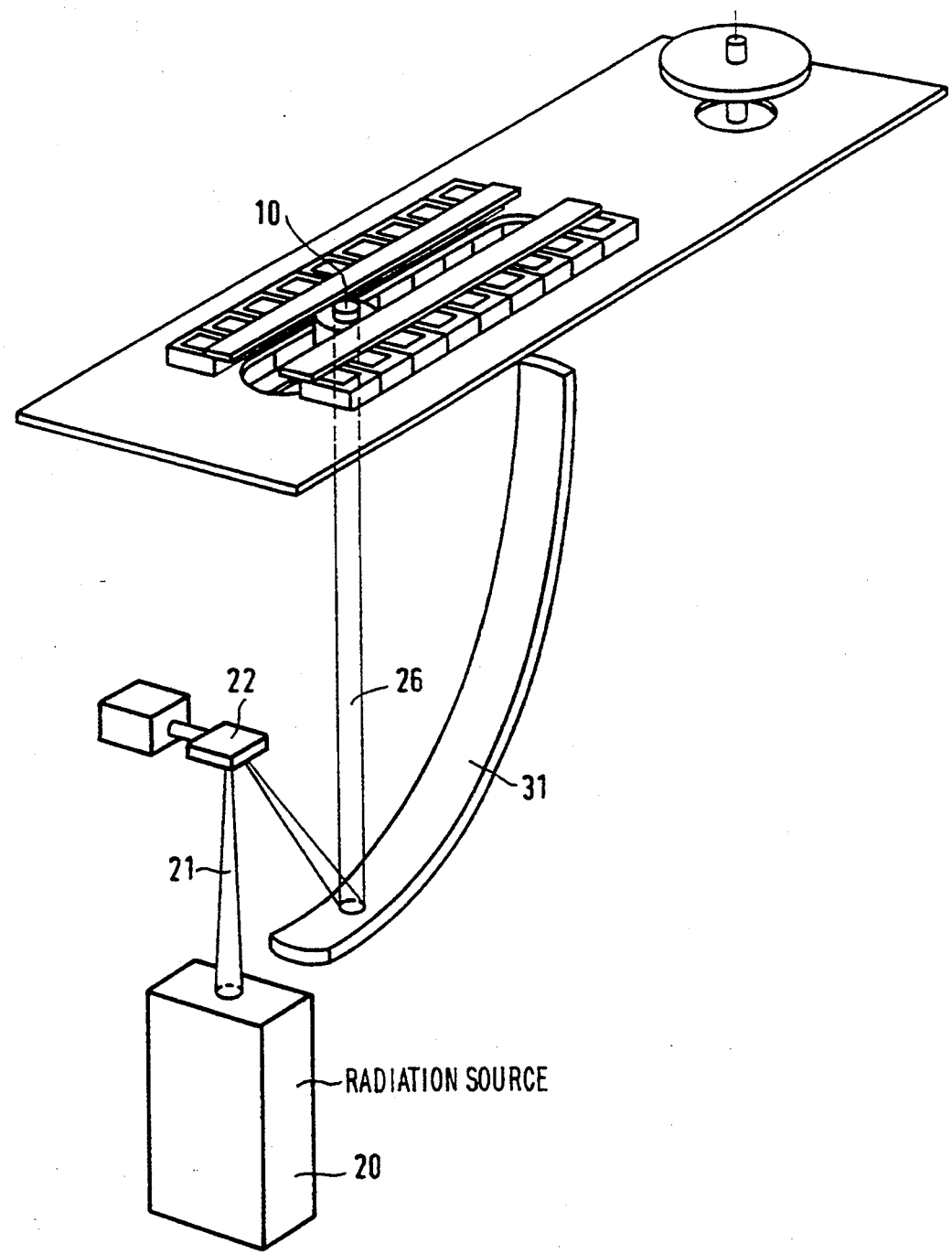
FIG. 3 shows a device comprising an elongated concave mirror.

FIG. 3 shows an embodiment of the device according to the invention in which the optical-strength element is a bar-shaped hollow mirror 31 instead of a bar-shaped lens. The beam 21 is focused on a point of the axis of rotation of the pivotal mirror 22. This point is also a focal point of the hollow mirror 31 which is a section of a paraboloid. Since the beam 21 is focused at a focal point of the hollow mirror, the beam 26 is collimated after reflection on the hollow mirror with a chief ray parallel to the optical axis of the paraboloid. A rotation of the pivotal mirror adapted to the movement of the objective system results in a parallel displacement of the beam 26 such that it can follow the objective system 13.

In the embodiments described above the beam 21 is focused on the pivotal mirror 22. To avoid a strong decrease of the reflection of the beam due to a dust particle on the reflective surface, preferably the rear side of the mirror should have a reflective coating. Then, however, possible small holes (pinholes) in the reflective surface may still cause reflection losses. The effect of such holes and simultaneously that of dust particles can be reduced considerably if the beam 21 is not exactly focused on the pivotal mirror but just in front of or behind it so that the beam forms a spot on the reflective surface, which spot is much larger than the dimension of a hole or a dust particle. However, the distance between the focal point of the beam 21 and the pivotal mirror should not be too large because otherwise the apparent point from which the scanning lens 23 (FIG. 1) or the hollow mirror 31 (FIG. 3) is irradiated is displaced too far during rotation of the pivotal mirror so that the direction of the beam 26 behind the lens or the mirror changes.

The influence of dust particles and holes on the pivotal mirror 22 can also be reduced by using cylindrical lenses in the radiation path. An embodiment of the device using cylindrical lenses is shown in FIG. 4. The beam 21 from the optical system 20 is focused to a focal line 41 on the pivotal mirror 22 by means of a cylindrical lens 40, which focal line is parallel to the axis of rotation of the pivotal mirror. The lens 40 preferably a double cylinder with crossed axes. To collimate the beam on one axis, into rays perpendicular to the axis of rotation of the mirror 22, the lens 40 is also cylindrical about a second axis perpendicular to the first cylinder axis, but with approximately twice the focal length of the first cylinder. A hole or dust particle can only cover a small part of the line-shaped spot 41 so that the beam can be influenced by such a hole or dust particle to a small extent only.

In order that the beam 24 formed by the scanning lens remains collimated, a second cylindrical element should be incorporated in the radiation path. To this end the scanning lens may be a cylindrical lens 42 whose cylindrical axis is parallel to the cylindrical axis of the cylindrical lens 40. Also in the device of FIG. 3 a cylindrical lens 40 may be arranged at the same position as in FIG. 4 so as to reduce the influence of dust particles and holes on the mirror 22. The second cylindrical strength may then be provided in the hollow mirror 31 by giving it the shape of a parabolic cylinder instead of a section of a paraboloid. The combination of the cylindrical lens 40 and the parabolic cylindrical mirror in the device of FIG. 3 has the additional advantage that the width of the beam 26 is independent of the position of the pivotal mirror 22.

FIG. 5a shows an embodiment of the device according to the invention which is very compact because the pivotal mirror has been omitted. Its function has been taken over by the optical system 20 which is rotatable about an axis of rotation 44. The system 20 supplies a diverging beam 45 which appears to come from a point on the axis of rotation 44, which point is located at a focal point of the scanning lens 23. The optical system 20 may be small and light weight so that a high scanning speed can be achieved. The beam 45 perpendicular to the scanning direction can be collimated by means of a cylindrical optical element in the optical system. This has the advantage that the scanning lens 23 may also be cylindrical so that the lens can be made at lower cost.

For scanning the radiation beam 45 an electronically driven scanning device 46, for example an acousto-optical or an electro-optical scanning device as shown in FIG. 5b may be used instead of a mechanically driven scanning element.

It will be evident that many of the elements of said embodiments can be combined. For example, the devices shown in FIGS. 4 and 5 may also be formed without the plane mirror 25, as described with reference to FIG. 1.

While the record carrier 1 is being scanned it must be ensured that the focal spot 11 formed by the objective system 13 remains centred on a track to be scanned. To this end the position and orientation of the objective system must be controlled with respect to said track. The position of the beam 26 with respect to the objective system must also be controlled so as to ensure that the objective lens 10 is correctly irradiated. The generation of the signals for these controls will be explained with reference to FIGS. 6 and 7.

Figure 6:
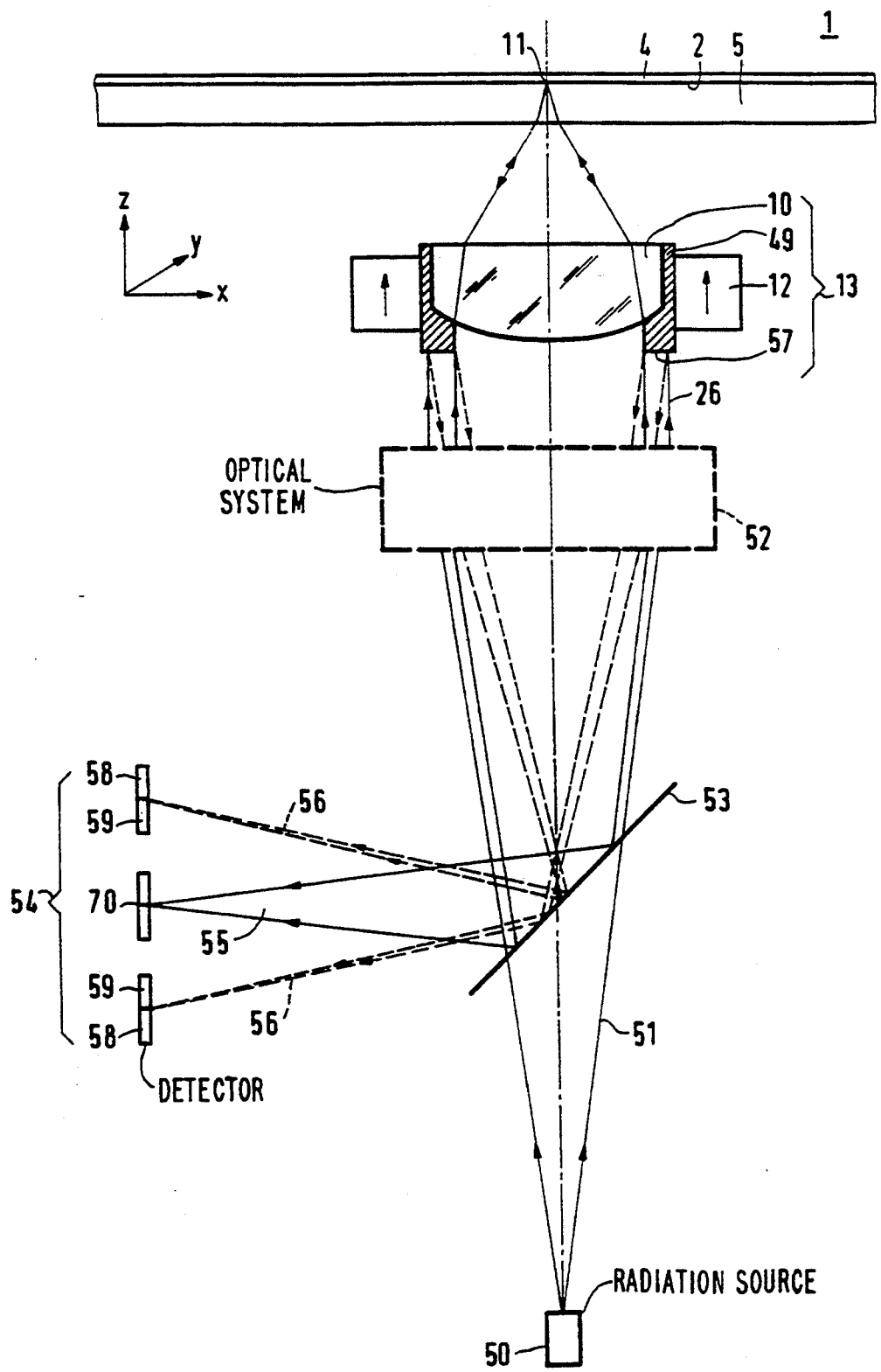
FIG. 6 shows diagrammatically the radiation path of the device.

FIG. 6 shows diagrammatically the radiation path of the device. The radiation source 50 supplies a radiation beam 51 which is collimated by an optical system 52 to the beam 26 which is focused to the focal spot 11 on the information layer 2 by the objective lens 10. The tracks in the information layer extend perpendicularly to the plane of the drawing. A part of the radiation reflected by the information layer 2 is deflected towards a detection unit 54 by a beam splitter 53 from the path of the projected beam 51. The beam splitter may be a splitting cube, a grating or a partially transmissive mirror; the Figure only shows the interface of the beam splitter. The radiation source, beam splitter, detection unit and possibly a part of the optical system are accommodated in the optical system 20 shown in FIG. 1. The optical system 52 comprises the scanning device, the scanning lens 23 and the possibly present plane mirror 25.

To be able to control the mutual position and orientation of the objective system and the beam 26, the deviations between the centre of the objective lens and the chief ray of the beam 26 in the X and Y directions and tilts of the objective lens about the X and Y axes must be measured so that the position deviations and tilts can be eliminated by means of a control system. The tilt of the objective lens about the X axis is indicated by means of the tilt angle $\alpha$ and the tilt about the Y axis is indicated by means of the tilt angle $\beta$. Distances and flits of the objective lens can be measured in accordance with the principle described in European Patent Specification no. 0 206 396 (PHN 11.416).

To this end an annular reflector 57 is fixedly secured around the objective lens. The annular reflector has a conical shape, i.e. the normal on the reflective surface is not parallel to the optical axis of the objective lens 10. The annular reflector reflects the annular portion of the beam 26 falling outside the entrance pupil of the objective lens. For a satisfactory determination of the position it is necessary that the beam has a smaller diameter than the outer diameter of the conical reflector, or that the intensity of the beam changes in the radial direction across the annular reflector. In order that the annular reflector is fixed with respect to the objective lens, the annular reflector 57 may form part of an objective holder or fitting 49 within which the objective lens is fixedly secured, as is shown in FIG. 6. The annular reflector may alternatively be a separate element which is secured on or within the objective fitting. The reflected annular beam 56, denoted by broken lines in FIG. 6, is incident via the beam splitter 53 on the radiation-sensitive detection unit 54 where it forms an annular radiation spot.

Figure 7:
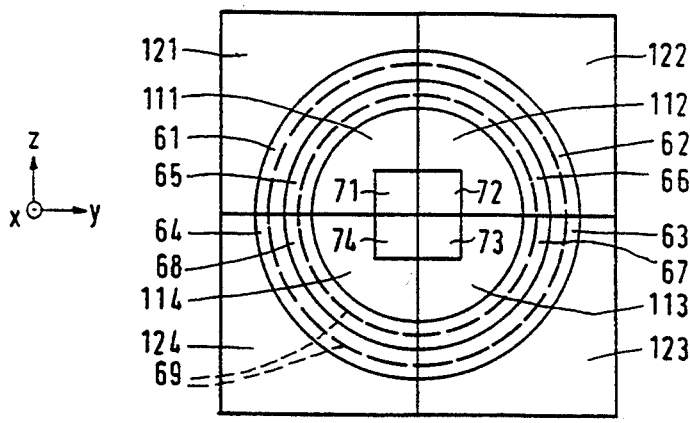
FIG. 7 is a front elevation of the detection unit.

FIG. 7 is a front elevational view of the detection unit 54. The indicated directions of the Y and Z axes are associated with the configuration shown in FIG. 6. The detection unit comprises two detector rings 58 and 59 separated by a narrow intermediate strip (not shown in the Figure), each ring comprising four detectors 61, 62, 63 and 64 and 65, 66, 67 and 68, respectively. The rims of the annular radiation spot are denoted by means of the broken line circles 69 in FIG. 7. The average diameter of this radiation spot is equal to that of the intermediate strip.

The radiation distribution among the eight detectors is dependent on the mutual position and orientation of the annular mirror 57, hence on that of the objective lens 10 and the beam 26. A tilt of the objective system about the X or Y axis has the result that the annular radiation spot 69 is moved in the Y or Z direction. A displacement of the mirror 57 along the X or Y axis causes a variation of the radiation distribution within the annular radiation spot 69, and this in such a manner that in case of a displacement along the X axis the upper portion of the detection system receives a larger or smaller quantity of radiation than the lower portion because then the quantities of radiation from the beam 26 incident on the parts of the annular reflector corresponding to the detector elements are no longer equal. Analogously, the left-hand portion of the detection system receives a larger or smaller quantity of radiation than the right-hand portion in the case of a displacement along the Y axis.

If the signals of the detectors are denoted by the capital letter S, with the reference numeral of the detector as an index, the displacements along the X and Y axes represented by the signals $S_X$ and $S_Y$ and the tilts about these axes, represented by the signals $S_\alpha$ and $S_\beta$, are given by:

$$S_X = (S_{61} + S_{62} + S_{65} + S_{66}) - (S_{63} + S_{64} + S_{67} + S_{68})$$

$$S_Y = (S_{62} + S_{63} + S_{66} + S_{67}) - (S_{61} + S_{64} + S_{65} + S_{68})$$

$$S_\alpha = (S_{62} + S_{63} + S_{65} + S_{68}) - (S_{66} + S_{67} + S_{61} + S_{64})$$

$$S_\beta = (S_{61} + S_{62} + S_{67} + S_{68}) - (S_{65} + S_{66} + S_{63} + S_{64})$$

The composite signals $S_X$, $S_Y$, $S_\alpha$ and $S_\beta$ are independent of each other and do not exhibit any crosstalk, so that the different displacements and tilts can be detected independently of each other. A rotation of the objective lens about the Z axis does not cause a change of the annular radiation spot 69 and thus does not influence the detector signals. The radiation spot 69 neither changes when there are small displacements of the objective lens along the Z axis.

To be able to control the mutual position of the objective system and the tracks in the record carrier, the deviation between the position of the focal spot 11 formed by the objective system along the Z axis and the position of the information layer 2 and the deviation between the position along the X axis of the focal spot 11 and the centre line of the track to be scanned must be measured. The position of the objective system can be corrected by means of the detected deviations in such a way that the radiation beam is always sharply focused on the information plane and the focal spot follows the desired track in spite of a possible unevenness and tilt of the information plane and eccentricity of the tracks.

The position of the objective system in the Z direction with which the focusing of the beam on the information plane is controlled, is detected as the distance between the objective lens and the information layer by means of a conventional focus error detection method. For example, in the radiation path of FIG. 6 the astigmatic focus error detection method can be used as is known inter alia from U.S. Pat. No. 4,023,033. To this end a component (not shown in the Figure) arranged between the beam splitter 53 and the detection unit 54, for example, a cylindrical lens or a grating introducing astigmatism renders the beam 55 reflected by the information layer astigmatic. The beam is detected by a four-quadrant detector 70 which is part of the detection unit 54. The four quadrants of the four-quadrant detector are denoted by the reference numerals 71, 72, 73 and 74 in FIG. 7. The signal $S_Z$ representing the focus error, i.e. the displacement along the Z axis, is given by:

$$S_Z = (S_{71} + S_{73}) - (S_{72} + S_{74}).$$

The position of the objective system in the X direction with respect to the tracks, with which the radial tracking of the beam is controlled, is detected as the distance between the centre of the focal spot and the centre line of the track to be scanned, using a conventional radial tracking error detection method. In the radiation path of FIG. 6 it is possible to use, for example, the push-pull tracking error detection method as is known, inter alia from U.S. Pat. No. 4,057,833(PHN 8.290). The signal $S_R$ representing the radial tracking error, i.e. said distance along the X axis, is given by:

$$S_R = (S_{71} + S_{72}) - (S_{73} + S_{74}).$$

The radial tracking error signal is denoted $S_R$ to distinguish it from the signal $S_X$, which signal also represents a displacement in the X direction, but then of the objective system with respect to the beam 26, rather than of the focal spot with respect to the tracks.

FIG. 4 is a perspective view of an embodiment of the coil system 15 according to the invention. The coil system comprises a series of coil pairs, with each pair comprising two coaxial coils arranged one above the other with their coil axis parallel to the Z axis. The front side of the perspective view shows two coil pairs in a cross-section, one comprising the coils 76 and 78, the other comprising the coils 77 and 79. The series of coil pairs are arranged in two parallel rows over the length of the stroke at both sides of the slit 14 accommodating the objective system. The two coils of each pair are arranged on the upper and lower sides of a printed circuit board 80 so that the coils can be easily connected electrically. Other components with electric connections in the device such as the optical system, and control means for the scanning device and for the coil system may also be mounted on the board and electrically connected to the printed circuit. The lower and upper sides of the coil system are provided with stops 75 for limiting the excursions of the objective system 13 in the Z direction and for preventing the objective system from going astray in the device when the current through the stationary coil system is switched off. The objective system is preferably moved to an end point of the stroke just before the coil system is switched off, and it is retained at this point by, for example, an arm 75' inserted in the slit 14 of the coil system so that the objective system cannot reciprocate in the slit and thus be damaged when the device is switched off. The objective system can also be retained by tilting one or more stops about the X axis so that the objective system is clamped between the stops. If the device does not need to scan the record carrier for some time, it is recommendable to retain the objective system with the aid of one of said mechanical means so that the coil system need not keep the objective system floating; the energy consumption of the device is thereby reduced.

Figure 8A:
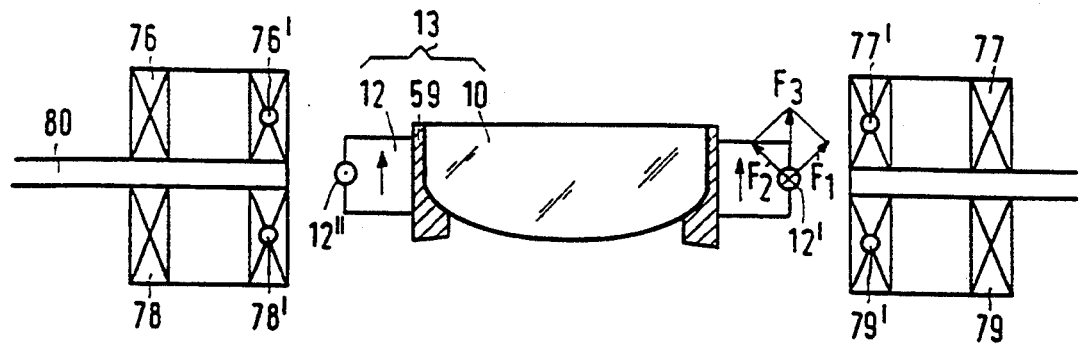
FIGS. 8a, 8b and 8c are three elevational views of the objective system in the stationary coil system.

The way in which the 5-D actuator can move the objective system in five degrees of freedom can be explained most simply with reference to a current model. In this model an axially magnetized permanent magnet is represented by an electrical band current around the outer circumference of the magnet. FIG. 8a shows a cross-section taken on the Y-Z plane of the objective system in a position midway between four adjacent coils 76-79; the X axis is perpendicular to the plane of the drawing and is directed backwards. The electrical currents are shown in a simplified form as concentrated currents which intersect the plane of the drawing perpendicularly, which is denoted by means of the circles 76', 77', 78' and 79'. The fictitious band current of the ring magnet is illustrated by means of the concentrated currents 12' and 12". The Figure shows the situation in which the current 77' in those windings of the coil 77 located closest to the ring magnet is directed backwards, while the current 79' in the subjacent coil 79 is directed forwards. Since elements in which currents of equal directions flow attract each other, the right-hand part of the ring magnet 12 will be attracted by the coil 77 and repelled by the coil 79. The resultant forces on the ring magnet 12, denoted by F1 and F2 lead to a resultant force F3 in the +Z direction. If the currents through the coils 76 and 78 at the other side of the objective system have the direction shown in the Figure and the same magnitude as the currents through the coils 77 and 79, the objective system will be subjected at both sides to an equal, upwardly directed force. By simultaneously controlling the currents 76', 77', 78' and 79', the position of the objective system along the Z axis can be controlled. If the directions of the currents 76' and 78' are reversed, the left-hand side of the objective system is subjected to a downward force, while the right-hand side is subjected to an upward force. A tilt of the objective system around the X axis can be realised in this way. Analogously, the objective system can be displaced along the Y axis by reversing the directions of the currents 76' and 77' with respect to the situation shown.

If the objective system is displaced along the X axis, the forces exerted by the currents 76', 77', 78' and 79' on the ring magnet will be reduced by the increasing distance between the ring magnet and the quartet of coils 76, 77, 78 and 79. To avoid this decrease of force, the energization currents must be gradually passed through the next coil quartet during the time when the objective system is displaced along the X axis so that the energization currents always flow through those coils which are located closest to the objective system. For example, if the objective system is displaced in the +X direction over a distance which is equal to half the coil period with respect to the situation shown in FIG. 8a, one half of each current 76', 77', 78' and 79' must flow through the quartet of coils 76, 77, 78 and 79 and the other half must flow in the same direction through the coil quartet located in the +X direction next to the first-mentioned coil quartet. If subsequently the objective system is displaced over a distance which is equal to three quarters of the coil period with respect to the situation shown in FIG. 8a, the ratio between the currents will be $\frac{1}{4}:\frac{3}{4}$. The coil period is equal to the distance in the X direction between the centres of the coil quartets located one after the other.

Figure 8B:
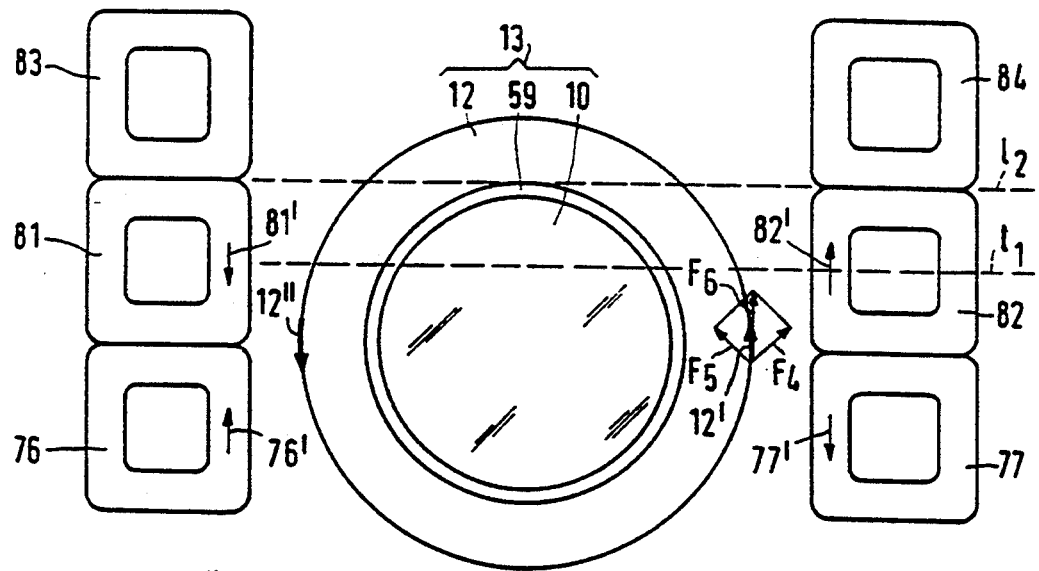

The movement of the objective system along the X axis will be explained with reference to FIG. 8b showing a cross-section of a portion of the 5-D actuator in the X–Y plane. The Z axis is perpendicular to the plane of the drawing and is directed forwards. With respect to the situation of FIG. 8a, the objective system has moved in the X direction over half a coil period. The Figure shows the superjacent coils 76, 77, 81, 82, 83, 84 of a first, a second and a third coil quartet, respectively. The subjacent coils of these coil quartets are not visible in FIG. 8b. To obtain a movement of the objective system in the +X direction, the currents 76', 77', 81' and 82' of the coils 76, 77, 81 and 82, respectively, should be in the direction shown and the superjacent coil and subjacent coil of a pair should carry currents of the same strength in the same direction. The attracting and repelling forces on the ring magnet caused by the currents 12' and 82' and 12' and 77', respectively, integrated over the circumference of the ring magnet are denoted by F4 and F5. The resultant force F6 through the coils 77, 82 and the two subjacent coils on the ring magnet 12 is in the +X direction. The currents flowing through the coils 76 and 81 located at the left-hand side of the ring magnet exert the same resultant force on the magnet. The total force on the objective system due to the currents 76', 77', 81' and 82' is thus in the +X direction. When the objective system is displaced along the X axis, the currents must be gradually taken over by other coils in order that the same force will be exerted on the ring magnet. If the centre of the objective system has arrived at the line 11 connecting the centres of the coils 81 and 82, the supplied forward force of the coils 81 and 82 has been reduced to zero. The function of the coils 81 and 82 should then have been taken over by the next coils 83, 84 so that the coils 76, 77, 83 and 84 then ensure the movement in the X direction. If the centre of the objective system is proximate to the line 12, the coils 81 and 82 can again exert a forward force and take over the function of the coils 76 and 77.

Figure 8C:
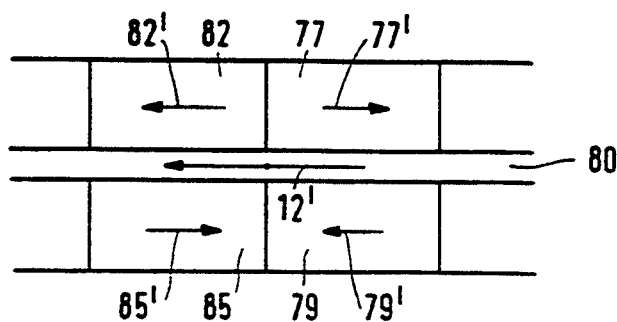

The movement which has not yet been explained, a tilt about the Y axis, can be realised by means of the coils 76, 77, 81 and 82 shown in FIG. 8b and the associated subjacent coils. The currents required for this tilt are shown in FIG. 8c which is an elevational view of the four coils 77, 79, 82 and 85 located at the right-hand side of the objective system, viewed from the centre of the objective system. The fictitious current 12' of the ring magnet is shown as a long arrow so as to distinguish between the forces exerted on the ring magnet by the coils 77 and 79 and the force exerted by the coils 82 and 85. The part of the ring magnet in the +X direction, i.e. the part close to the head of the arrow 12', will be attracted by the current 82' and repelled by the current 85' and will thus be subjected to a force in the +Z direction. The part of the ring magnet in the −X direction will be repelled by the current 77' and attracted by the current 79' so that a force in the −Z direction occurs. Both forces supply a couple which causes the objective system to tilt about the Y axis. It will be evident that the current distribution at the left-hand side of the objective system in the coils 76 and 81 and the subjacent coils should be such that the same equally directed couple is generated. If the centre of the objective system is proximate to the line 11 connecting the centres of the coils 81 and 82, the function of the coils 81 and 82 must be taken over by the next coils 83 and 84, analogously to the situation in the case of displacement in the X direction, so that the coils 76, 77, 83 and 84 and the subjacent coils ensure the tilt about the Y axis.

It has been described in the foregoing which coils of the stationary coil system must be energized and which direction the energization currents should have to obtain a movement of the objective system in one of the five degrees of freedom. It will be evident that the currents in the coils to be energized must be reversed for the same movement in an opposite direction. If the objective system must perform different movements simultaneously, for example a displacement and a tilt, each one of the selected coils must be energized with a current which is the sum of the separate currents with which the relevant coil should have to be energized to realise the separate movements. In the case of a stationary objective system the coils will still have to exert a force in the Z direction on the ring magnet so as to compensate for the effect of the force of gravity. Due to the small weight of the objective system the electric power required for this purpose is generally smaller than 1 Watt.

If the record carrier has large excursions in the Z direction, the objective system must have a long stroke in this direction. The stroke in the Z direction of the 5-D actuator as shown in FIGS. 8a, 8b and 8c can be increased by arranging an additional row of coils between the coil pairs above and below the board 80, as is known, inter alia from European Patent Specification no. 0 233 380 (PHN 11.626). The extra coils are then substantially used for displacing the objective system in the X and Y directions, whereas the coil pairs are substantially used for displacements in the Z direction and for tilts about the X and Y axes. A long stroke in the Z direction can also be realised by means of a coil system in which a part of the windings is present above and below the ring magnet 12, as is known, inter alia from European Patent Applications no. 0 214 677 (PHD 85-119) and 0 215 498 (PHD 85-099). Said windings may be part of the coil pairs or of an extra row of coils. Since the windings then enclose the objective system in the Z direction, the windings take over the function of the stops 75.

In the above-described embodiments of the device according to the invention the coil axes of the coils are parallel to the Z axis, while the permanent magnet in the objective system is magnetized in the Z direction. As the part of the coil windings located closest to the slit is important for generating the forces, the orientation of the part further remote from the slit is of lesser importance. Consequently, a coil axis which deviates from the Z direction will have little effect on the operation of the actuator. However, the density of turns at the side of the slit must be as large as possible in order to exert a maximum possible force on the objective system by means of a given current through the turns. This can easily be realised with a rectangular cross-section of the separate coils of the coil system. The actuator may also be formed with the coil axes parallel to the X axis, while the permanent magnet should then be magnetized in the X direction.

The control of the position and orientation of the objective system and of the scanning device has for its object to cause the focal spot 11 to track the track to be read on the record carrier when the record carrier is being rotated. This control according to the invention is based on the following data: 1) the position of the focal spot is substantially determined by the position of the objective lens, 2) the adjustment of the scanning device is determined by the requirement that the radiation beam must irradiate the objective lens satisfactorily, 3) the position of the objective system along the X axis can be derived from the orientation of the scanning device.

Figure 9:
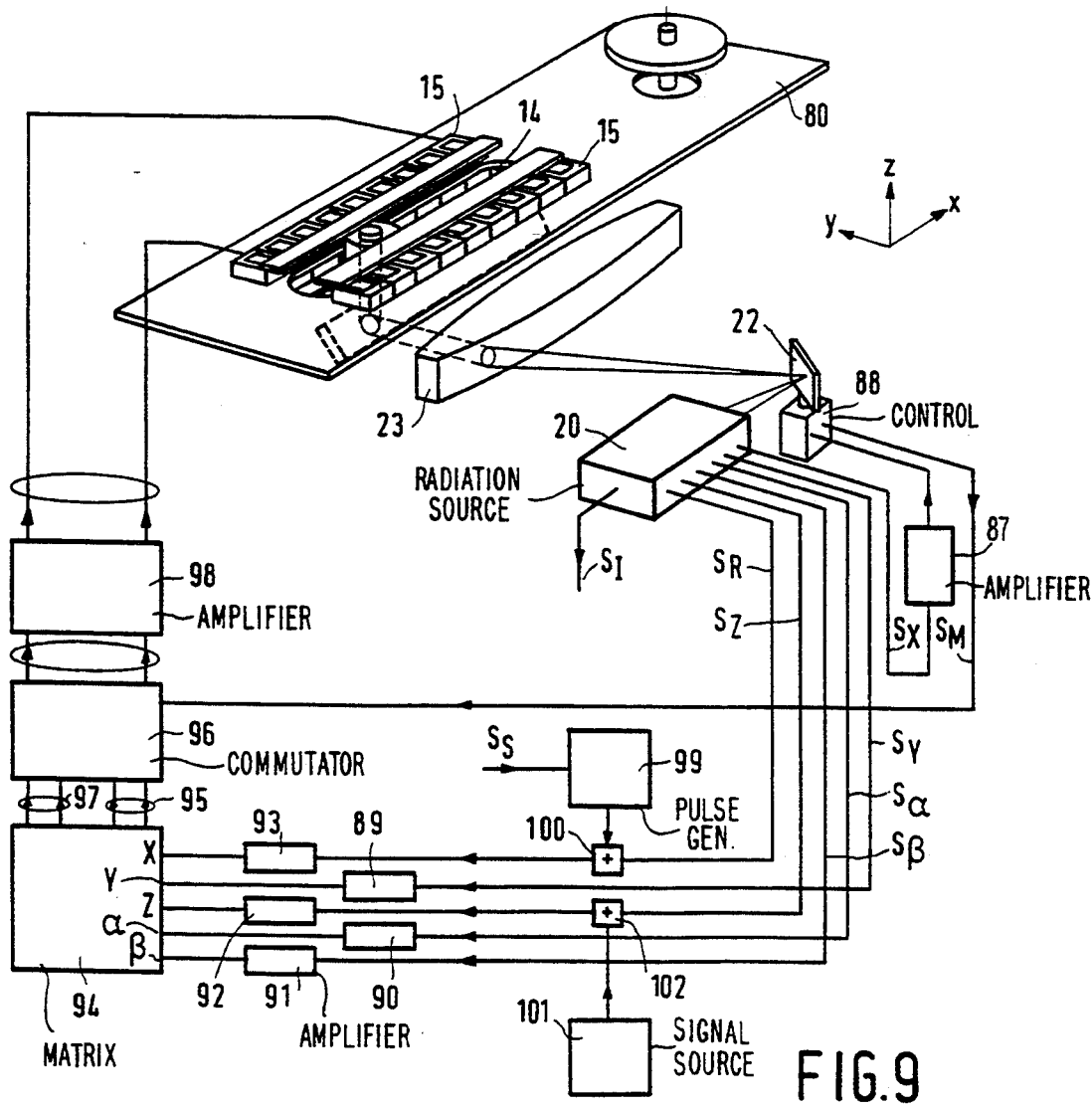
FIG. 9 shows the circuit diagram of a control circuit for the objective system and the pivotal mirror.

FIG. 9 shows a block diagram of an embodiment of the circuit for controlling the position and orientation of the objective system and the scanning device in the device of FIG. 1. The six signals $S_X$, $S_Y$, $S_\alpha$, $S_\beta S_Z$ and $S_R$, generated in the optical system 20, are used in the circuit as follows. The radial tracking error signal $S_R$ indicating how far the focal spot in the radial direction, i.e. the X direction, is positioned next to the track to be tracked is used to correct the position of the objective system in the X direction so as to minimize the error. The focus error signal $S_Z$ indicating how far the tracks are out of focus is used to correct the position of the objective system in the Z direction. The signals $S_\alpha$ and $S_\beta$ indicating by which angles, as rotations around the X and Y axes, the optical axis of the objective lens extends to the axis of the irradiating beam are used to control the orientation of the objective system in such a way that these angles become as small as possible. The signal $S_Y$ indicates how far the centre of the objective system is displaced in the Y direction with respect to the centre of the irradiating beam 26. By giving the device a satisfactory design, it can be ensured that the centre of the irradiating beam is always on the centre line of the slit 14 of the coil system 15. By correcting the position of the objective system in the Y direction by means of the signal $S_Y$ in such a way that the distance between the centre of the objective system and the centre of the beam is as small as possible, the objective system is also retained in the centre of the slit 14, viewed in the Y direction. The signal $S_X$ indicating how far the centre of the objective system is displaced in the X direction with respect to the centre of the irradiating beam is used to control the pivotal mirror 22 in such a way that the irradiating beam follows the objective system in the X direction as accurately as possible so that the objective lens is correctly irradiated at all positions within the stroke 3. The control of the pivotal mirror is a coarse control and replaces the coarse control of the carriage in the device known from the afore-mentioned U.S. Pat. No. 4,363,116.

As is shown in FIG. 9, the signal $S_X$, generated in the optical system 20, is applied to a control input of a unit 88 via an amplifier and stabilization circuit 87. The unit comprises an actuator for rotating the pivotal mirror 22 and an orientation sensor for the pivotal mirror. A signal $S_M$, supplied by this sensor, represents the orientation of the pivotal mirror and hence the position along the X axis of the irradiating beam. The sensor may be an optical, capacitive or inductive sensor. The amplifier and stabilization circuit 87 comprises a known amplifier and filter for stabilizing the control for the pivotal mirror.

The signals $S_R$, $S_Y$, $S_Z$, $S_\alpha$ and $S_\beta$ are applied to the inputs for the X, Y, Z, $\alpha$ and $\beta$ control, respectively, of a matrix circuit 94 via amplifier and stabilization circuits 89–93, each having a function which is comparable with that of circuit 87. This matrix circuit is known per se from European Patent Specification no. 0 233 380 (PHN 11.626) and generates for each input signal a plurality of output currents in response to and proportionally to this input signal, which output currents are applied to the coil system 15 and realise a movement of the objective system in accordance with the relevant input signal. The circuit establishes the relationships between the five input signals and 12 output currents, which relationships can be represented as numbers in a matrix. For example, the signal $S_Z$ for the Z position of the objective system is applied to the input for the Z control of the matrix circuit 94 via the amplifier and stabilization circuit 92. The circuit subsequently generates those four output currents, denoted by 76', 77', 78' and 79' in FIG. 8a which bring about a displacement of the objective system along the Z axis. The four output currents are proportional to the output signal of the amplifier and stabilization circuit 92. Analogously, four output currents which are added to the four currents associated with $S_Z$ are generated for the signals $S_Y$ and $S_\alpha$. The resultant four output currents are applied to a commutator 96 via a bundle 95 of at least five wires: one wire per output current and one common wire. The matrix circuit generates eight output currents for each one of the signals $S_X$ and $S_\beta$, four of which are shown in FIG. 8b and denoted by 76', 77', 81' and 82' and are used for energizing the coils at the upper side of the board 80, while the other four equivalent output currents are used for energizing the subjacent coils. The two series of eight currents associated with $S_X$ and $S_\beta$ are added two and two together and subsequently applied to the commutator via a bundle 97 of at least 9 wires.

For the satisfactory operation of the device according to the invention a commutator 96 is required which passes the currents supplied by the wires in the bundles 95 and 97 through the coils of the coil system 15 in the manner described above. The commutator may be formed in different, more or less conventional manners. If the objective system 13 is in the position shown in FIG. 8b, the four currents of the bundle 95 must be applied to the coils 76, 77, 81, 82 as well as to the four subjacent coils, as explained hereinbefore with reference to FIG. 8a. Moreover, each one of the eight currents in bundle 97 must pass through a separate coil of the quartet 76, 77, 81, 82 and the quartet of subjacent coils as explained hereinbefore with reference to Fig. 8b. If in FIG. 8b the centre of the objective system 13 is located on the line 11 connecting the centres of the coils 81 and 82, the four currents of the bundle 95 must be passed through the coils 81, 82 and the two subjacent coils, and the eight currents of the bundle 97 must be passed through the coils 76, 77, 83, 84 and the subjacent coils. If the objective system is displaced along the X axis, the commutator ensures that gradually more current is passed to the coils towards which the objective system moves and less current is passed to the coils from which the objective system moves away so that the force exerted on the ring magnet by the coil system is independent of the position of the ring magnet. Dependent on the shape of the coils and the ring magnet, it may be necessary to amplify or reduce the currents dependent on the situation so as to obtain the required position independence of the magnetic forces. The required reduction and amplification can be decreased by giving the separate coils a rectangular cross-section. If the coil period is small in comparison with the diameter of the ting magnet, the number of coils in the proximity of the objective system which is energized must be increased so as to obtain a reasonable distribution of the forces and avoid large current intensities.

For a satisfactory selection of the coils the commutator must know the position of the objective system. This information is obtained from the signal $S_M$ of the position sensor within the unit 88, which signal indicates the position along the X axis of the irradiating beam and, when the control is active, also indicates that of the objective system. The commutator distributes the currents of the 12 inputs over a number of outputs in the manner described, one output for each coil of the coil system in FIG. 9. The number of coils in the coil system is determined by the length of the stroke 3, the size of the objective system, the strength of the magnetic field of the ring magnet and the desired accuracy of the control. In the device shown in FIG. 9 the diameter of the objective system is equal to 2 to 3 coil periods and each row of the coil system has nine coil pairs. The number of outputs of the commutator is thus 36 in this case.

The outputs of the commutator 96 are connected to as many inputs of an amplifier unit 98 for amplifying each incoming current. Each output of the amplifier unit is connected to a coil of the coil system. These connections may be realised via wires and/or via print tracks on the board 80. The components of the control, such as the amplifier and stabilization circuits, the matrix circuit, the commutator and the amplifier unit, as well as the optical system 20 and the unit 88, may be mounted on the same board 80 so as to limit the number of connections and reduce the costs.

To cause the focal spot to skip a series of tracks in order to go to another track in an accelerated manner, the objective system must be moved rapidly in the X direction for a short time. For this rapid displacement the device generates a search signal $S_S$ which is based on the known, current position of the focal spot and the new, desired position. In its turn, the search signal $S_S$ energizes a pulse generator 99. The pulse generated by the pulse generator is added to the signal $S_R$ via an adder circuit 100. During the pulse there will be a large force in the X direction on the ring magnet, which force will first accelerate the objective system and then slow it down. The end point of the rapid displacement can be determined by counting in known manner the tracks that have been passed or by reading address information from the record carrier just before the end of the path and by accurately determining with reference thereto the point where the objective system must come to a standstill.

In operation the coil system must exert a constant force on the ring magnet so as to compensate for the force of gravity. In FIG. 9 this force is in the Z direction. The effect of the position control along the Z axis is improved if a constant signal whose magnitude is dependent on the mass of the objective system and the characteristics of the control loop for displacement in the Z direction is added in a circuit 101 to the signal $S_Z$ via an adder circuit 102.

The device according to the invention may then operate as follows. If the device is put into operation, the radiation beam is first passed towards the position in the slit of the coil system where the objective system is retained. Subsequently the controls for the position of the objective system in the X and Y directions, the controls for the rotations about the X and Y axes and the control for the orientation of the pivotal mirror are put into operation, the possible compensation for the force of gravity is adjusted and the objective system is released. If a record carrier is provided, the objective system is moved so far in the +Z direction until the focal spot is proximate to the information layer 2, whereafter the focus control in the Z direction is put into operation. Finally, the track to be scanned is searched, whereafter the radial control is put into operation. If for some reason or other the irradiating beam loses the objective system, all controls must be switched off. Subsequently the beam is scanned through the stroke 3 in the X direction. As soon as the detection unit 54 in FIG. 6 measures a reflection of the objective system, the scan stops and the controls are switched on again.

The angle between the optical axis of the objective system and the chief ray of the beam 24 must be relatively small to put the controls into operation. In other words, when the controls are put into operation, the annular radiation spot 69 may not be eccentric by more than a quarter of its diameter with respect to the detector rings 58 and 59. The mechanical tolerances of the means retaining the objective system in the slit for putting the controls into operation can be alleviated if the capturing range of the detection unit is increased. This can be realised in the device shown in FIG. 6 by means of the detection unit 54. The detection unit can be considered to be a four-quadrant detector having bounding lines which are parallel to the Y and Z axes and comprising the detector rings 58, 59, the four-quadrant detector 70 and the detector areas located outside the rings and denoted by the reference numerals 111–114 and 121–124 in FIG. 7. A tilt of the objective system about the X or Y axis causes a shift of the radiation spot 69 on the detection unit in the Y or Z direction, respectively, which can be detected by measuring the light distribution over the four quadrants. If the signals generated by radiation incident on the areas are denoted by $S_{111}$–$S_{114}$ and $S_{121}$–$S_{124}$, a shift on the detection unit in the Y and Z directions is represented by the following signals $S_\beta'$ and $S_\beta'$:

$$S_{\alpha'} = (S_{122} + S_{62} + S_{66} + S_{112} + S_{72} + S_{123} + S_{63} + S_{67} + S_{113} + S_{73}) - (S_{121} + S_{61} + S_{65} + S_{111} + S_{71} + S_{124} + S_{64} + S_{68} + S_{114} + S_{74})$$

$$S_{\beta'} = (S_{121} + S_{61} + S_{65} + S_{111} + S_{71} + S_{122} + S_{62} + S_{66} + S_{112} + S_{72}) - (S_{123} + S_{63} + S_{67} + S_{113} + S_{73} + S_{124} + S_{64} + S_{68} + S_{114} + S_{74})$$

When the controls of the device with the wider capturing range are put into operation, the signals $S_\alpha'$ and $S_\beta'$ are first applied to the inputs of the controls for the tilts $\alpha$ and $\beta$, respectively so that the light spot is passed to the centre of the detection unit. Subsequently the signals $S_\alpha'$ and $S_\beta'$ are replaced by the signals $S_\alpha$ and $S_\beta$, respectively, for performing the fine controls of the tilts. Since the capturing range of the detection unit is proportional to the size of the detection unit, the capturing range can be chosen by means of this size. The electronic circuit for generating the signals $S_\alpha'$ and $S_\beta'$ can be simplified without detrimentally influencing the capturing range if in each quadrant a part of the areas of the detection unit, for example the parts within the ring 58, is not used for generating these signals. A particularly simple circuit is obtained if only the detector rings 58 and 59 are used. In that ease the signals $S_\alpha'$ and $S_\beta'$ are identical to the previously mentioned signals $S_Y$ and $S_X$, respectively. When the controls are put into operation, the signals $S_Y$ and $S_X$ are first applied to the inputs for the controls for the tilts $\alpha$ and $\beta$, whereafter these are replaced by the signals $S_\alpha$ and $S_\beta$ by means of a switch.

Figure 10:
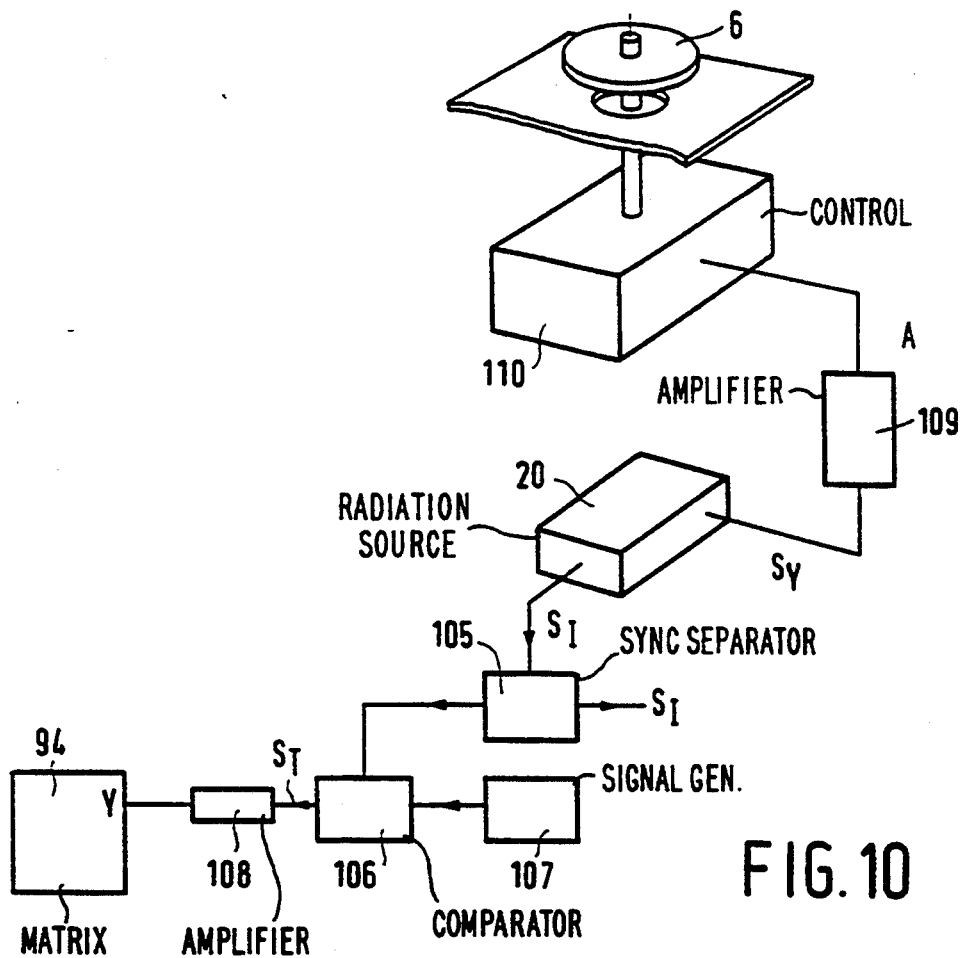
FIG. 10 shows the circuit diagram of a control circuit for correcting tangential time errors. Identical reference numerals in the different figures denote identical elements.

In some uses, for example, when reading record carriers having analogously coded video information or digitally coded data, it may be desirable to correct for tangential position deviations of the focal spot, also referred to as time errors or jitter. An implementation of such a correction is shown in FIG. 10. The information signal $S_I$, which can be obtained from the detection unit in the optical system 20, also comprises synchronization information in the case of analog video information. A sync separator 105 retrieves the synchronization information from the video information and applies a signal with the synchronization information to a comparison circuit 106. A generator 107, for example a time base generator, generates a signal at a fixed frequency which is also applied to the comparison circuit 106. The output signal $S_T$ of the comparison circuit is proportional to the phase difference between the two input signals and is thus a measure of the tangential time error when the record carrier is being read. The time error can be corrected by correcting the position of the focal spot in the tangential direction across the track to be scanned. In the implementation shown in FIG. 10 the control is split up into a rapid and a slow control. In the rapid control the position of the objective system in the Y direction is controlled by the signal $S_T$. To this end the signal $S_T$ is connected to the Y input of the matrix circuit 94 via an amplifier and stabilization circuit 108, the control of the objective system in the Y direction further being carried out as described with reference to FIG. 9. In a device comprising the rapid control only, with which small as well as large time errors must be corrected, there is the risk that the objective system abuts against the coil system in the Y direction. To avoid this, a slow control for the large time errors is provided, which corrects the rotational speed of the record carrier. The slow control uses the signal $S_Y$ which indicates how far the objective system is off-centre with respect to the irradiating beam and thus off-centre with respect to the slit 14 of the coil system. By applying the signal $S_Y$ via an amplifier and stabilization circuit 109 to a control input of the control 110 for driving the shaft of the motor, the number of revolutions of the motor can be controlled in such a way that the signal $S_Y$ is as small as possible and the objective system thus remains approximately in the centre of the slit.

The electronic equipment required for the controls may be made compact by integrating the different components such as the amplifier and stabilization circuits, the matrix circuit, the commutator and the amplifier unit in a small number of circuits or even in one circuit. A further simplification can be achieved if all signals or a part thereof are digitally processed. The functions of the components 89–101 may then be performed by one or more computing units. Moreover the number of wires in the bundles 95 and 97 can be reduced. The A/D and D/A conversions of the signals can often be realised at a fast rate and a small bit width; in many cases a width of one bit will be sufficient.

The device according to the invention has the advantage that the optical and electro-magnetical components have wide measurement and position tolerances so that the device has a low cost price. The great accuracy of positioning the focal spot required for scanning the tracks and hence of the objective system is achieved by the controls described. They retain the objective system at the desired position within 1 μm in the Z direction and within 0.1 μm in the X direction. These are conventional tolerances for devices for scanning optical record carriers. The scanning device 22 need not have these accuracies. In fact, the position of the focal spot is independent of the position of the irradiating beam with respect to the objective system; the only requirement is that the objective lens in the objective system receives sufficient light from the beam. For this reason a position accuracy of approximately 1 mm for the beam in the X direction as well as the Y direction is sufficient. Such an accuracy can be realised without any problems with the embodiments described. Possible deviations in magnitude and direction of the forces exerted by the mils on the objective system as a result of deviations in position and shape of the mils in the coil system are fully compensated for by the feedback controls. The same applies to crosstalk in which the drive of the coil system for a displacement or tilt of the objective system in a given direction also results in a small displacement and/or a tilt in another direction. The crosstalk in the detection unit, in which a signal representing, for example the position of the objective system in the Y direction is influenced by a tilt of the objective system about the X axis, is so small that it does not have any noticeable influence on the controls. The small crosstalk and the automatic compensation by the controls ensure that the device has wide manufacturing tolerances while still achieving the required scanning accuracy.

A known problem in controls is the occurrence of offsets. These may be caused by, for example an alignment of the detection unit which is not completely correct, a non-rotationally symmetrical intensity distribution within the irradiation beam or by offsets of amplifiers. These offsets can be compensated for once in the assembly of the device. It is alternatively possible to check and correct the compensation in a procedure to be carried out regularly. The latter may be effected by reading a track and by determining the number of errors in the read information by means of an error correction system which is generally present in devices for reading digital information. The number of errors increases in the case of an incorrect adjustment of a component, for example in the case of a tilt of the objective system caused by an offset in the signal $S_\alpha$. By varying the tilt, the orientation at which the number of errors in the information of the read track is minimal can be determined. Such an offset must now be added to the signal $S_\alpha$, that the objective system occupies the desired position. At such a compensation a possible crosstalk of one control to another should be taken into account.

Although all embodiments of the device described are based on scanning optical disc-shaped record carriers, they may alternatively be used for non-circular record carriers, for example in the form of a card. It will be evident that the principles described are usable for scanning an arbitrary surface. The device has the advantage of the combination of a high resolving power due to the possibility of a high numerical aperture of the objective lens and a high scanning speed by the actuator for the objective system. If a surface to be scanned is moved in the Y direction, this movement, together with that of the objective system along a straight line in the X direction, yields an image of the surface in a rectangular system of coordinates, which simplifies the processing of picture information. The combination of a high numerical aperture and the rate is very suitable, inter alia, for scanning biological preparations.

I claim:

1. A device for optically scanning a surface, comprising a radiation source for supplying a radiation beam,
means for directing said beam along a first path,
an objective lens having an optical axis, mounted in an objective system for receiving said radiation beam from said first path and for focusing the radiation beam along a second path generally parallel to said axis on said surface, and
drive means for displacing the objective system over a given stroke crossing a multiplicity of scan-resolvable locations in a direction transverse to said axis,
wherein said means for directing includes an optical-strength element having a length in a length direction approximately equal to said stroke, disposed in said first path with said length direction transverse to a portion of said first path, and
a scanning device for scanning the radiation beam across said optical-strength element in a direction parallel to said length direction, thereby displacing said portion of said first path over a distance approximately equal to said stroke, in a direction transverse to the direction of said portion while maintaining that portion of the radiation beam parallel to itself.

2. A device as claimed in claim 1, characterized in that the scanning device comprises a pivotal mirror.

3. A device as claimed in claim 1, characterized in that the scanning device comprises means for pivoting the radiation source.

4. A device as claimed in claim 1, characterized in that at least one cylindrical optical element is arranged in the path of the radiation beam.

5. A device as claimed in any one of claim 1, characterized in that the optical-strength element comprises a hollow mirror.

6. A device as claimed in claim 1, characterized in that a plane mirror is arranged between the radiation source and the objective lens.

7. A device as claimed in claim 1, characterized in that the device comprises a detector for determining the direction of the beam originating from the scanning device, an output of said detector being connected to a control input of the objective drive means.

8. A device as claimed in claim 1, characterized in that the device comprises a four-quadrant detector for generating signals representing the orientation of the objective system.

9. A device as claimed in claim 1, characterized in that a substantially conical annular reflector is arranged around the objective lens for reflecting a part of the radiation beam towards a detection unit for generating signals representing the position and orientation of the objective system.

10. A device as claimed in claim 9, characterized in that a permanent magnet for driving the objective system is arranged in the objective system and in that the drive means comprise a stationary coil system for electromagnetically and contactlessly driving the objective system along three mutually perpendicular axes and for tilting the objective system about two of said axes, the coil system comprising two parallel rows of coil pairs located over the length of the stroke at both sides of the objective system and each coil pair comprising two coils arranged one above the other in the direction of the optical axis of the objective lens.

11. A device as claimed in claim 5, characterized in that said scanning device comprises a pivotal mirror.

12. A device for optically scanning a surface, comprising
a radiation source for supplying a radiation beam,
means for directing said beam along a first path,
an objective lens having an optical axis, mounted in an objective system for receiving said radiation beam from said first path and for focusing the radiation beam along a second path generally parallel to said axis on said surface, and
drive means for displacing the objective system over a given stroke crossing a multiplicity of scan-resolvable locations in a direction transverse to said axis,
wherein said means for directing includes an optical-strength element having a focal point, and having a length in a length direction approximately equal to said stroke, disposed in said first path with said length direction transverse to a portion of said first path, and
a scanning device disposed between said source and said element for scanning the radiation beam across said optical-strength element in a direction parallel to said length direction, thereby displacing said portion of said first path over a distance approximately equal to said stroke, in a direction transverse to the direction of said portion while maintaining that portion of the radiation beam parallel to itself, and
said device further includes means for focusing said beam at said focal point of said optical-strength element.

13. A device as claimed in claim 12, characterized in that the focal point is substantially located on an axis about which the radiation beam is scanned.

14. A device as claimed in claim 13, characterized in that said scanning device comprises a pivotal mirror.

15. A device as claimed in claim 1, characterized by further comprising an elongated mirror having a length at least equal to said stroke, disposed between said optical strength element and said objective lens, for directing said beam from said portion of said first path to a third path between the elongated mirror and the objective lens.

16. A device as claimed in claim 1, characterized in that the optical-strength element comprises a lens.

17. A device for optically scanning a surface, comprising
a radiation source for supplying a radiation beam,
means for directing said beam along a first path,
an objective lens having an objective optical axis, mounted in an objective system for receiving said radiation beam from said first path and for focusing the radiation beam along a second path generally parallel to said axis on said surface,
drive means for displacing the objective system over a given stroke crossing a multiplicity of scan-resolvable locations in a direction transverse to said axis,
means for substantially collimating said beam along a portion of said first path, said means for collimating including an optical strength element having a length in a length direction approximately equal to said stroke, disposed in said first path with said length direction transverse to said portion of said first path, and
a scanning device for scanning the radiation beam across said optical strength element in a direction parallel to said length direction, thereby displacing said portion of said first path over a distance approximately equal to said stroke, in a direction transverse to the direction of said portion while maintaining that portion of the radiation beam parallel to itself.

18. A device as claimed in claim 17, characterized in that the lens is formed by a bar-shaped, non-central portion of an imaginary circular lens, the radiation beam being focused on the optical axis of the circular lens.

19. A device as claimed in claim 17, characterized by further comprising an elongated mirror having a length at least equal to said stroke, disposed between said optical strength element and said objective lens, for directing said beam from said portion of said first path to a third path between the elongated mirror and the objective lens.

20. A device as claimed in claim 19, characterized in that the optical-strength element comprises a lens.

21. A device as claimed in claim 20, characterized in that said lens is formed by a bar-shaped, non-central portion of a circular lens, having an offset optical axis, the radiation beam being focused at a focal point on maid offset optical axis.

22. A device as claimed in claim 17, characterized in that said scanning device comprises a pivoting mirror having a reflecting surface, arranged for pivoting about an axis to direct the beam toward and scan across the optical strength element; and said means for substantially collimating further comprises a cylindrical lens disposed for focusing said beam into a line parallel to said pivoting axis on the reflecting surface of said mirror.

23. A device as claimed in claim 22, characterized in that the optical-strength element comprises a cylindrical lens.

24. A device as claimed in claim 23, characterized by further comprising an elongated mirror having a length at least equal to said stroke, disposed between said optical strength element and said objective lens, for directing said beam from said portion of said first path to a third path between the elongated mirror and the objective lens.

25. A device as claimed in claim 22, characterized in that the optical-strength element comprises a parabolic cylindrical mirror.

26. A device as claimed in claim 17, characterized in that maid optical strength element has a focal point, and said scanning device comprises a pivoting mirror having a reflecting surface, arranged for pivoting about a pivot axis to direct the beam toward and scan across the optical strength element, with said focal point lying substantially on said reflecting surface and said pivot axis.

* * * * *